(12) United States Patent
Jain

(10) Patent No.: US 6,332,164 B1
(45) Date of Patent: Dec. 18, 2001

(54) SYSTEM FOR RECIPIENT CONTROL OF E-MAIL MESSAGE BY SENDING COMPLETE VERSION OF MESSAGE ONLY WITH CONFIRMATION FROM RECIPIENT TO RECEIVE MESSAGE

(75) Inventor: Ajay Jain, Holmdel, NJ (US)

(73) Assignee: AT&T Corp., New York, NY (US)

( * ) Notice: Subject to any disclaimer, the term of this patent is extended or adjusted under 35 U.S.C. 154(b) by 0 days.

(21) Appl. No.: 08/957,464

(22) Filed: Oct. 24, 1997

(51) Int. Cl.[7] ...................................................... G06F 15/16
(52) U.S. Cl. ............................................. 709/235; 709/203
(58) Field of Search ................................... 709/203, 235, 709/219, 217

(56) References Cited

U.S. PATENT DOCUMENTS

| | | | |
|---|---|---|---|
| 5,710,883 | * | 1/1998 | Hong et al. . |
| 5,771,355 | * | 6/1998 | Kuzma ................................. 709/232 |
| 5,781,901 | * | 7/1998 | Kuzma .................................... 707/10 |
| 5,793,972 | * | 8/1998 | Shane .................................... 709/219 |
| 5,809,242 | * | 9/1998 | Shaw et al. ........................... 709/217 |
| 5,822,543 | * | 10/1998 | Dunn et al. ........................... 709/224 |
| 5,956,521 | * | 9/1999 | Wang ..................................... 710/35 |

* cited by examiner

Primary Examiner—Krisna Lim

(57) ABSTRACT

A method and apparatus provide recipient control of the delivery of an electronic message. The sender of the message, which can be text, audio, video and multimedia, delivers the message to the recipient's carrier's optimally located mail server. Rather than sending the complete message, the sender's mail server transmits a short message containing in the header a mail server address and/or hyperlink where the message resides, along with the address and/or hyperlink of any applet needed to read the message. The recipient can then choose whether or not to receive the entire message.

22 Claims, 4 Drawing Sheets ns and systems for transmitting messages via computer networks, and more particularly to a method and system for controlling the transmission of an electronic message sent by a computer over a computer network.

SYSTEM FOR RECIPIENT CONTROL OF E-MAIL MESSAGE BY SENDING COMPLETE VERSION OF MESSAGE ONLY WITH CONFIRMATION FROM RECIPIENT TO RECEIVE MESSAGE

BACKGROUND OF THE INVENTION

The present invention relates generally to methods and systems for transmitting messages via computer networks, and more particularly to a method and system for controlling the transmission of an electronic message sent by a computer over a computer network.

Computer messaging, termed E-mail, is well known, and has become a ubiquitous tool for business in the 1990's. With the advent of the Internet, E-mail has become a tool for use by advertisers and others, as well, who often blanket users with undesired "junk" E-mail similar to junk mail. In fact, the technology exists for advertisers to completely overwhelm the Internet and users with electronic mail should several advertisers desire to attempt to reach all users of the Internet at once with either large graphics intensive files or multimedia files.

The present invention is therefore directed to the problem of developing a method and a system for controlling the transmission of electronic mail so that users do not get bombarded with electronic mail they do not desire, thereby limiting the ability of E-mail senders to broadcast messages to all users over the Internet.

SUMMARY OF THE INVENTION

The present invention solves this problem by placing control of the delivery of the E-mail in the hands of the recipient of the E-mail rather than in the hands of the sender. As a result, the present invention automatically limits the transmission of E-mail to those who are actually interested in it.

According to the present invention, a user is notified that he currently has an E-mail addressed to him regarding some particular advertisement. In this case, if the user is not interested, the user can avoid having that E-mail message sent to him. This reduces the traffic of E-mail over the Internet because only those messages that someone desires to receive will be transmitted over the Internet. This prevents valuable Internet transmission resources from being wasted on E-mail that the recipient will simply discard.

Furthermore, as a result of the present invention, information is now available as to how many users were actually interested in the advertisement, whereas prior to the present invention no advertiser knows how many users actually read the E-mail, but only those who took the time to respond to it. This added information enables the advertiser to tailor future advertisements to attempt to capture the users who were interested but for some reason did not respond, or to broaden the appeal of the advertisement itself Moreover, the present invention enables advertisers to know how much of the E-mail was read, not simply the fact that it was received.

In addition, as a result of the present invention, advertisers can create larger, more creative E-mail messages without worrying that they will overwhelm the Internet by attempting to send a large file to all users at once, which otherwise might generate more ill-will towards the advertiser than the advertisement justifies. The net result is that the action of each user filters out the messages in which they are not interested, thus requiring transmission of messages only in the case where the recipient is actually interested in the content of the message.

Therefore, according to the present invention, a method for controlling a transfer of an electronic message over a computer network, includes the steps of: a) receiving an electronic message from an originator to be transmitted to a recipient over the computer network; b) storing a complete version of the electronic message in a mail server; c) forwarding a brief message to the recipient indicating that the electronic message exists and asking if the recipient desires to receive a parsed version of the electronic message; d) transmitting the parsed version of the electronic message to the recipient upon receiving an indication that the recipient desires to receive the parsed version in response to the request in step c); and e) formatting the parsed version of the electronic message to include a mail server address where the complete version of the electronic message is stored.

One particularly advantageous implementation of the above method includes the step of including a hyperlink in the parsed version of the electronic message to a location where the complete version of the electronic message is stored.

Another particularly advantageous implementation of the above method includes the step of including either an address of a location where an applet is stored, which applet is required to read the complete electronic message, or a hyperlink to that location.

According to the present invention, the complete version of the electronic message is only transmitted if the recipient indicates a willingness to receive the complete version of the electronic message.

Yet another particularly advantageous implementation of the above method includes the step of maintaining a table of users who are to receive the electronic message and indicating which users have retrieved the complete version of the electronic message from the mail server.

Another particularly advantageous implementation of the above method includes the step of deleting the complete version of the electronic message from the mail server when all of the users in the table have either retrieved the complete version of the electronic message from the mail server or have deleted the parsed version of the electronic message from their mail server.

According to the present invention, a mail server for controlling a transfer of an electronic message over a computer network includes a processor and a storage device. The processor is programmed to perform the following functions for each electronic message: (i) creating a new message with a header from the electronic message and an address of a location of a complete version of the electronic message in the first mail server; (ii) associating a table with each electronic message to capture a message delivery time stamp, and a granularity of the electronic message read; (iii) generating a report on all successful deliveries of each complete electronic version of the electronic message; and (iv) transmitting a confirmation transaction to the sender upon request by the sender. The storage device stores the complete version of all electronic messages until they are read.

According to the present invention, a method for transmitting an electronic message over the Internet, includes the steps of: a) mailing an electronic message from the sender to a first mail server, which message is addressed to a recipient; b) storing a complete version of the electronic message in the first server, wherein the first mail server is a nearest mail server to the sender in the recipient's network; c) polling the recipient to determine if the recipient is willing to receive a parsed version of the electronic message; d) delivering the complete version of the electronic message to the recipient's mail server if the recipient's response to the poll in step c) is no.

One particularly advantageous implementation of the above method includes the step e) of performing the following substeps if the recipient's response to the poll in step c) is yes: (i) creating the parsed version of the electronic message, which parsed version includes the same header as the complete version as well as a hyper-link to a storage location where the complete version of the electronic message is stored, along with any applet required to read the complete version of the electronic message; and (ii) making a table entry of all recipients of the electronic message.

Another particularly advantageous implementation of the above method occurs when the step e) further includes the substeps of: (iii) sending the parsed version of the electronic message as a regular electronic message to the recipient's mail server; (iv) delivering, when the recipient logs on the recipient's mail server, the parsed version of the electronic message; and (v) sending a transaction to the mail server from the client to delete the recipient's entry from the table, if the recipient decides to delete the parsed version of the electronic message without reading the complete version of the electronic message.

Another particularly advantageous implementation of the above method occurs when the step e) further includes the substeps of: (vi) deleting the complete version of the electronic message if the recipient in step (v) is an only remaining entry in the table; (vii) delivering the complete version of the electronic message if the recipient decides to read the complete version of the electronic message using a file transfer protocol mechanism; (viii) making an entry in the table that the complete version of the electronic message was delivered along with a time stamp and a number of blocks down-loaded; and (ix) sending a transaction to confirm delivery of the complete version of the electronic message, based on the sender's option, along with the time stamp and a number of pages the recipient has read.

Yet another particularly advantageous implementation of the above method includes the step of providing a complete translation from an IP address of the recipient to the recipients' profile data.

Another embodiment of the present invention includes an apparatus for transmitting an electronic message over the Internet. This embodiment includes a first server, a storage device, a polling means, and a delivery means. The first server receives an electronic message from the sender, which electronic message is addressed to a recipient. According to the present invention, the first mail server is the nearest mail server to the sender in the recipient's network. The storage device is coupled to the first server and stores a complete version of the electronic message. The polling means polls the recipient to determine if the recipient is willing to receive a parsed version of the electronic message. The delivery means delivers the complete version of the electronic message to the recipient's mail server if the recipient's response to the poll is no.

Another particularly advantageous implementation of the above apparatus includes a copying means, a creating means, and a table entry making means. The copying means copies a message header from the electronic message. The creating means creates the brief version of the electronic message, which includes a hyper-link to a storage location where the complete version of the electronic message is stored, along with any applet required to read the complete version of the electronic message. The table entry means makes a table entry of all recipients of the electronic message.

Another particularly advantageous implementation of the above apparatus includes a transmitting means, a second delivery means, and a transaction sending means. The transmitting means sends the brief version of the electronic message as a regular electronic message to the recipient's mail server, if the recipient indicates a willingness to receive the brief version. The second delivery means delivers, when the recipient logs on the recipient's mail server, only the brief version of the electronic message. The transaction sending means sends a transaction to the first mail server from the client to delete the recipient's entry from the table, if the recipient decides to delete the brief version of the electronic message without reading the complete version.

Another particularly advantageous implementation of the above apparatus includes a deleting means, a third delivery means, a second table entry making means, and a fourth delivery means. The deleting means deletes the complete version of the electronic message if the recipient is an only remaining entry in the table. The third delivery means delivers the complete version of the electronic message if the recipient decides to read the complete version using a file transfer protocol mechanism. The second table entry making means makes an entry in the table that the complete version of the electronic message was delivered along with a time stamp and a number of blocks down-loaded. The fourth delivery means sends a transaction to confirm delivery of the complete version of the electronic message, based on the sender's option, along with the time stamp and a number of pages the recipient has read.

Yet another particularly advantageous implementation of the above method includes a means for providing a complete translation from an IP address of the recipient to the recipients' profile data.

DETAILED DESCRIPTION

Figure 1:
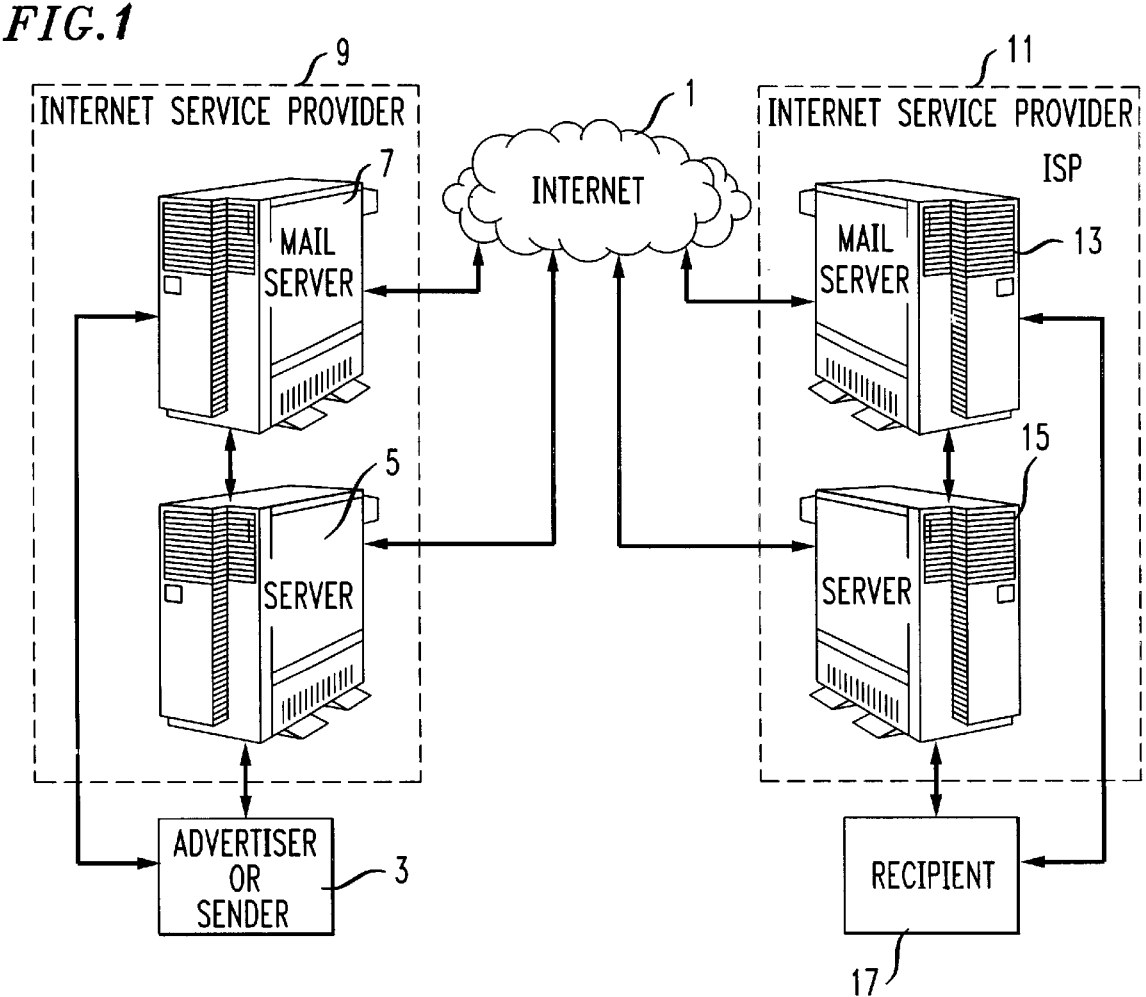
FIG. 1 depicts the flow of an E-mail message according to the present invention.
Figure 2:
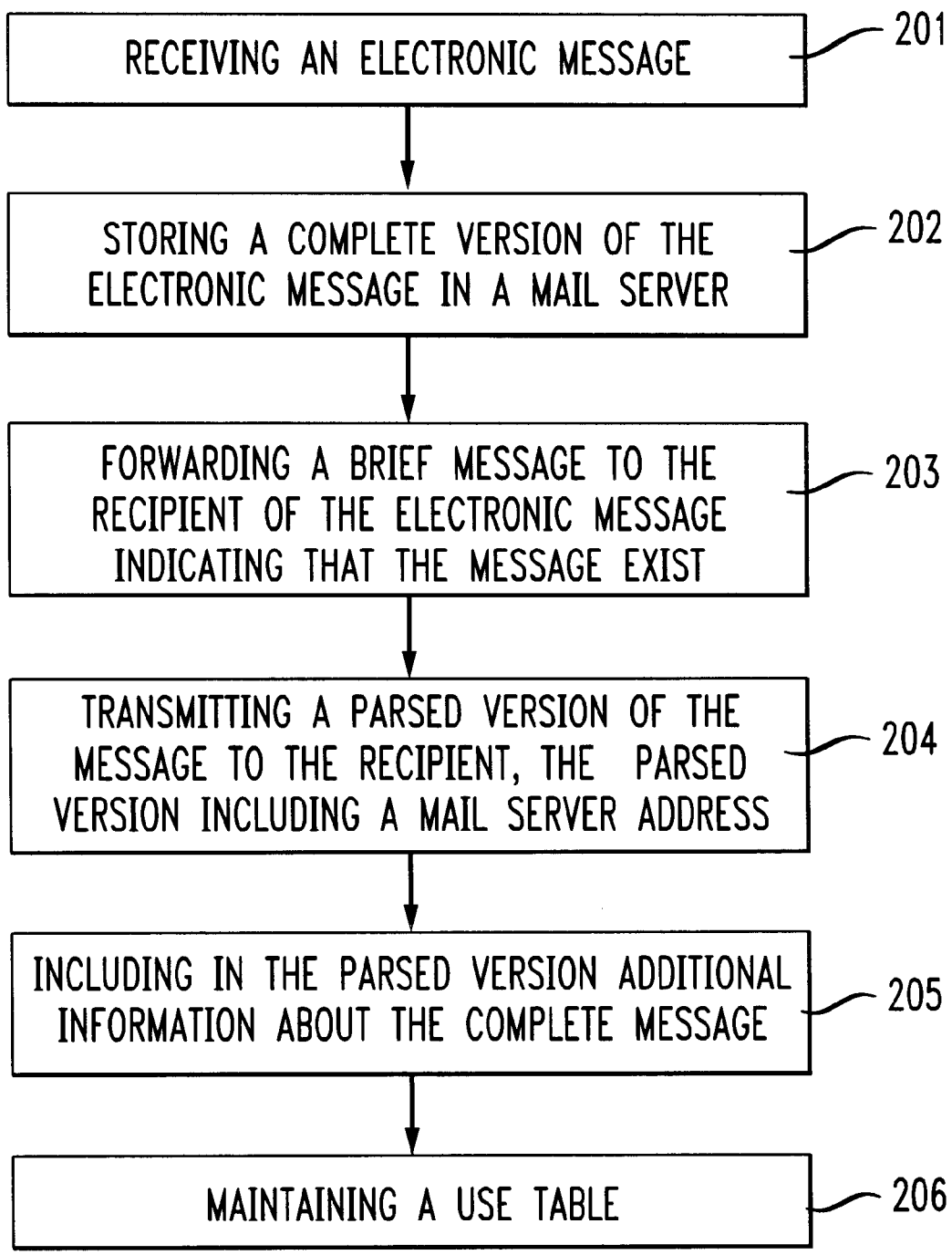
FIG. 2 is a flow chart depicting features according to an embodiment of the present invention.
Figure 3:
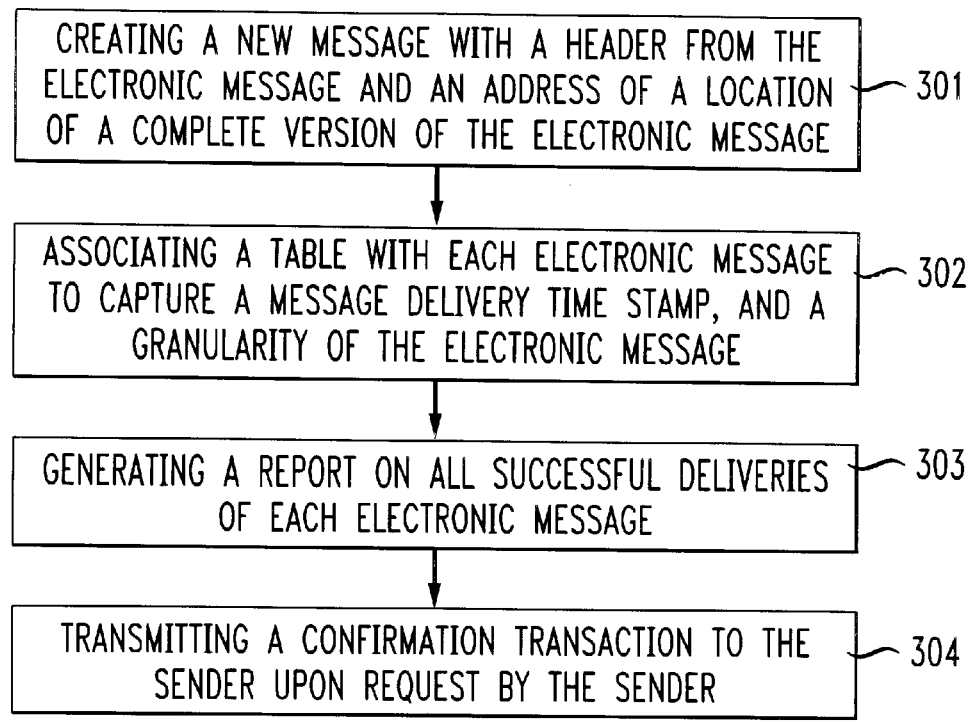
FIG. 3 is a flow chart depicting features according to an embodiment of the present invention.
Figure 4:
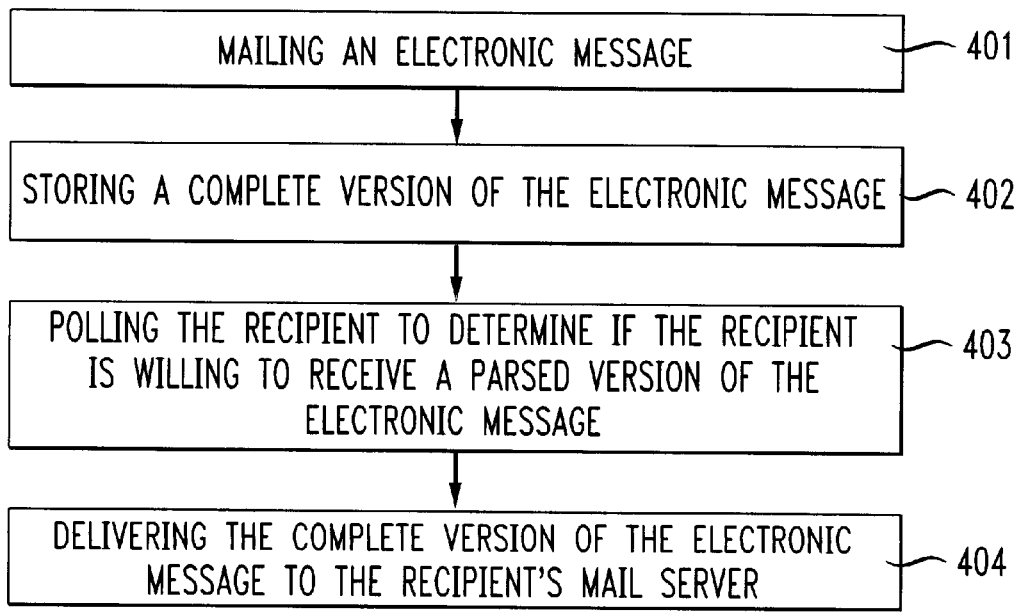
FIG. 4 is a flow chart depicting features according to an embodiment of the present invention.
Figure 5:
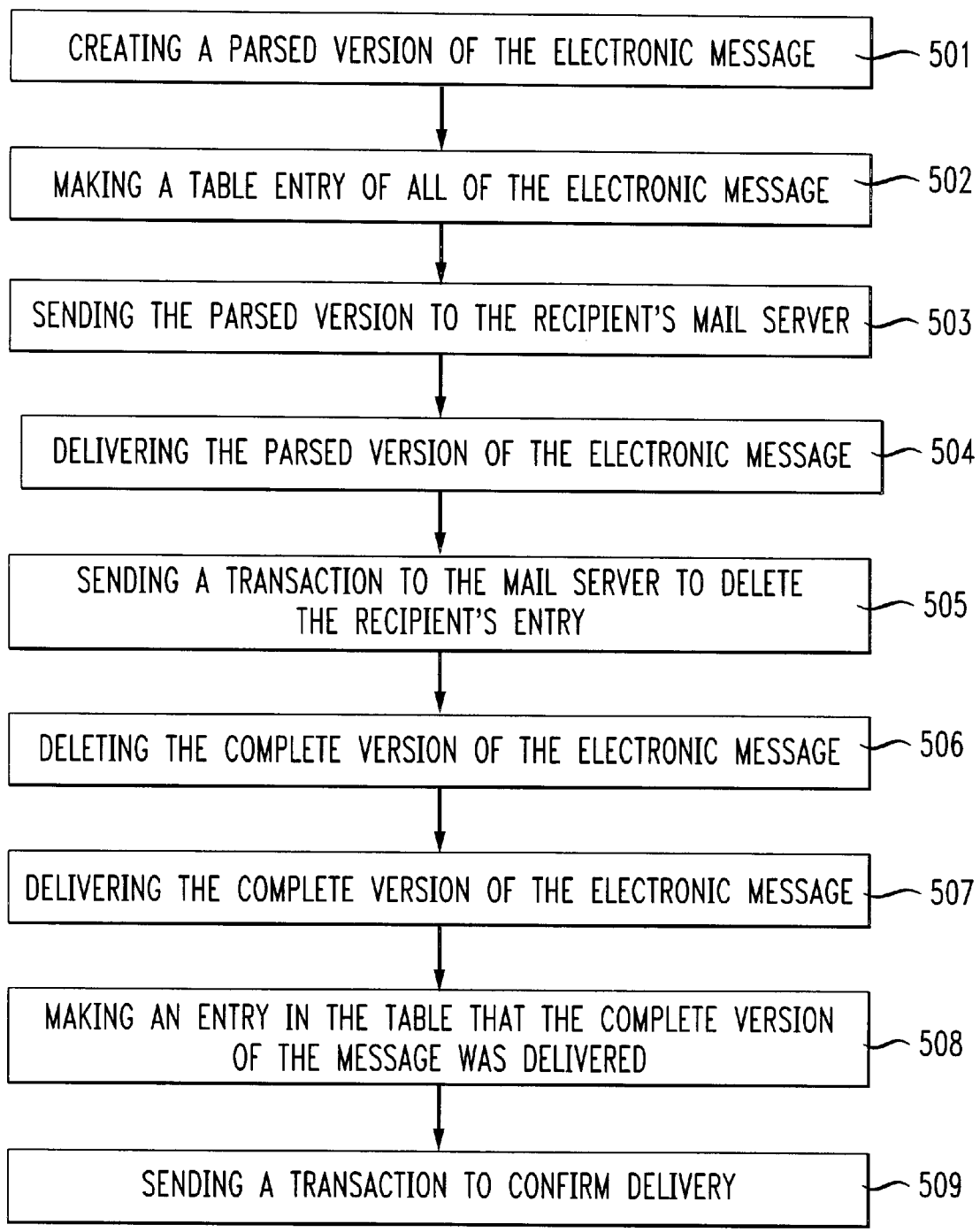
FIG. 5 is a flow chart depicting features according to an embodiment of the present invention.

The present invention defines a new paradigm for message delivery by providing control in the hands of the recipient(s) of an electronic message rather than in the hands of the sender. This is particularly critical as direct marketers are beginning to use more and more push technology to reach the customer base globally.

The present invention can be implemented by the recipient's service provider with out involving other service providers. The sender of the mail delivers the electronic message, which can include text, audio, video and/or multimedia, to the recipient's carrier's optimally located mail server. Rather than sending the complete message, the sender's mail server transmits a short message, which contains the header of the original message and a mail server address and/or hyperlink where the message is residing along with the address and/or hyperlink of any applet(s) needed to read the message.

The present invention can be implemented on a recipient's carrier's optimally located mail server. One has to negotiate an agreement with the delivery carrier (ISP) of the recipient to provide information on the recipient. This consists of basically an IP address to customer information translation.

The mail server will have at least the following capabilities for each message.

(1) The capability to parse the message header and message content.

(2) The capability to create a new message whose content includes a hyperlink to the location of the original message's content and any applet(s) needed to read the original message's content.

(3) The capability to create a table associated with each message to capture the message delivery time stamp, and the granularity of the message read, i.e., the fact that the message was accessed by a recipient, and/or the number of blocks of the message downloaded by the file transfer protocol mechanism.

(4) The capability to generate a report if the sender wants a report on the successful delivery of the message; this report includes all the recipients who picked up the message.

(5) The capability to send a confirmation transaction to the sender if so desired.

(6) The capability to store all messages at least temporarily until they are read. In this case, the messages will have some time limit after which the mail server will delete them even if they are not read yet by all users.

According to the present invention, the simplified call flow will be as follows:

1. The sending party mails a message.
2. The nearest mail server to the sender in the recipients network stores the E-mail.
3. The recipient is polled to find out if it is willing to receive a parsed message. If response is yes then the following steps are followed. If response is no then the message is delivered as a regular E-mail message, i.e., according to the prior art.
4. The mail server copies the header from the original message and populates the message content with a hyper-link to the storage area where the complete message is stored, along with a hyperlink to any needed applet(s) to read the complete message, thereby creating a new, but brief message.
5. A table entry is made of all the recipients of the message connected with this server.
6. The newly created brief message is sent as a regular message to the recipient's mail server.
7. When the recipient logs on to his mail server, only the brief message with the header information and hyper-link information is delivered.
8. If the recipient decides to delete the brief message without reading the complete message, then a transaction is sent to the server from the client to delete the entry from the table. If this recipient is the only entry then the server deletes the complete message also.
9. If recipient decides to read the complete message then the complete message is delivered to the recipient using the file transfer protocol (ftp) mechanism and an entry is made in the table that the message was delivered along with the time stamp and number of blocks down-loaded. If the transfer is interrupted, the ftp mechanism will note the number of blocks downloaded before interruption. (The assumption is that the recipient will at least read the portion of the message that was downloaded.)
10. On successful delivery of the message, based on the sender's option, a transaction is sent to confirm the delivery of the E-mail to the recipient, along with a time stamp and the number of pages the recipient has read, i.e., blocks downloaded.
11. The recipient's ISP will provide a complete translation from an IP address to the recipient's profile data as a service to the advertiser.

This service is provided for the sending party and the sending party then is charged for delivery of the message delivery. However, the receiving party maintains control of the reception of the E-mail. The receiving party can store the message locally or on the server, as well.

The key differences relative to current practice are:

Introduction of a new paradigm—The recipient receives the message delivery on his/her terms.

Introduction of hyper-links in the message content to link with the complete message.

Introduction of the usage of file transfer protocol (ftp) to supplement messaging, which enables additional information to be made available to the sender, such as the number of blocks downloaded.

Introduction of multimedia, video, and high bandwidth user messaging without bogging down the network by using asynchronous delivery of the content along with multicast and push technologies. By placing only one copy of a message on the Internet, even if the message is intended for 100,000 users, the message can be very large without placing any significant burden on the Internet. In contrast, if a large file was stored in 100,000 different locations, the burden on the Internet is extreme, particularly since the file must be transferred to 100,000 different locations and then stored on potentially 100,000 different mail servers.

Introduction of certified delivery of the messages across all the carriers. By using ftp one can determine that the file is actually received by the intended recipient, which is not the case for E-mail.

Introduction of secured message delivery across all the carriers.

Introduction of market intelligence delivery to the target direct marketer.

Collection of the recipients message content pickup time, granularity of the content read, etc.

This set of enhancements will enable the customized calling experience for a segment of customers.

Referring now to FIG. 1, shown therein is an advertiser or sender 3 coupled to the Internet 1 via an Internet Service Provider (ISP) 9 and a recipient 17 also coupled to the Internet 1 via an Internet Service Provider (ISP) 11. ISP 9 and ISP 11 could either be the same ISP or a different ISP. We shall assume they are different for purposes of this description, however, the problem simply becomes easier if they are the same.

Each of the ISP's has a mail server 7, 13 and a server 5, 15, through which the user accesses the ISP and the Internet. When the advertiser 3 desires to send an E-mail to recipient 17, he creates the message, completes the header, which includes the recipient's E-mail address and transmits the message to the ISP 9 in the normal manner.

It is at this point that the present invention diverges from the standard E-mail message delivery. When the mail server 7 receives the E-mail, it sends a message to the recipient 17 via the Internet and the mail server 13 asking the recipient 17 if it wishes to receive a parsed E-mail message.

If the recipient 17 answers affirmatively, the mail server sends an abbreviated version of the E-mail to the recipient 17. The abbreviated version of the E-mail message includes a mail server address and/or hyperlink where the message is residing, along with the address and/or hyperlink of the applet(s), if needed, to read the message. If the user then clicks on the hyperlink, the complete message is transmitted to the recipient 17.

If the recipient 17 answers negatively, then the mail server transmits the complete message to the user.

If the recipient 17 decides to delete the abbreviated message without reading the complete message, then the mail server 13 transmits a message to the mail server 7 indicating that the user did not want to receive the message. The mail server 7 then deletes the user entry from the table indicating the users to receive the message. If this is the only user remaining, the complete message is then deleted.

What is claimed is:

1. A method for controlling a transfer of an electronic message over a computer network, comprising the steps of:
    a) receiving an electronic message from an originator to be transmitted to a recipient over the computer network;
    b) storing a complete version of the electronic message in a mail server;
    c) forwarding a brief message to recipient indicating that the electronic message exists and asking if the recipient desires to receive a parsed version of the electronic message;
    d) transmitting the parsed version of the electronic message to the recipient upon receiving an indication that the recipient desires to receive the parsed version in response to the request in step c); and
    e) formatting the parsed version of the electronic message to include a mail server address where the electronic message is stored.

2. The method according to claim 1, further comprising the step of:
    f) including a hyperlink to where the complete version of the electronic message is stored in the parsed version of the electronic message.

3. The method according to claim 1, further comprising the step of:
    f) including an address of an applet required to read the complete version of the electronic message.

4. The method according to claim 1, further comprising the step of:
    f) including a hyperlink to where an applet is stored, which applet is required to read the complete version of the electronic message.

5. The method according to claim 1, further comprising the step of:
    f) including an address of a plurality of applets required to read the complete version of the electronic message.

6. The method according to claim 1, further comprising the step of:
    f) including a hyperlink to where a plurality of applets are stored, which plurality of applets are required to read the complete version of the electronic message.

7. The method according to claim 1, further comprising the step of:
    f) transmitting the complete version of the electronic message to the recipient only if the recipient indicates a willingness to receive the complete version of the electronic message.

8. The method according to claim 1, further comprising the step of:
    f) maintaining a table of users who are to receive the electronic message and indicating which users have retrieved the complete version of the electronic message from the mail server.

9. The method according to claim 8, further comprising the step of:
    g) deleting the complete version of the electronic message from the mail server when all of the users in the table have either retrieved the complete version of the electronic message from the mail server or have deleted the parsed version of the electronic message from their mail server.

10. The method according to claim 1, wherein the electronic message includes text, voice, multimedia, graphics, animation, video or MPEG data.

11. A mail server for controlling a transfer of an electronic message over a computer network comprising:
    a) a processor being programmed to perform the following functions for each electronic message:
        (i) creating a new message with a header from the electronic message and an address of a location of a complete version of the electronic message in the first mail server;
        (ii) associating a table with each electronic message to capture a message delivery time stamp, and a granularity of the electronic message read;
        (iii) generating a report on all successful deliveries of each electronic message; and
        (iv) transmitting a confirmation transaction to the sender upon request by the sender; and
    b) storage for storing all electronic messages until they are read.

12. The mail server according to claim 11, wherein the processor formats the new message to include a hyperlink to a location of the complete version of the electronic message, and a hyperlink to a location of any applet necessary to read the complete version of the electronic message.

13. A method for transmitting an electronic message over the Internet, comprising the steps of:
    a) mailing an electronic message from the sender to a first mail server, which message is addressed to a recipient;
    b) storing a complete version of the electronic message in the first server, wherein the first mail server is a nearest mail server to the sender in the recipient's network;
    c) polling the recipient to determine if the recipient is willing to receive a parsed version of the electronic message;
    d) delivering the complete version of the electronic message to the recipient's mail server if the recipient's response to the poll in step c) is no.

14. The method according to claim 13, further comprising the step of:
    e) performing the following steps if the recipient's response to the poll in step c) is yes:
        (i) creating the parsed version of the electronic message, which parsed version includes the same header as the complete version as well as a hyperlink to a storage location where the complete version of the electronic message is stored, along with any applet required to read the complete version of the electronic message; and
        (ii) making a table entry of all recipients of the electronic message.

15. The method according to claim 14, wherein step e) further comprises the substeps of:
    (iii) sending the parsed version of the electronic message as a regular electronic message to the recipient's mail server;

(iv) delivering, when the recipient logs on the recipient's mail server, the parsed version of the electronic message;

(v) sending a transaction to the mail server from the client to delete the recipient's entry from the table, if the recipient decides to delete the parsed version of the electronic message without reading the complete version of the electronic message.

16. The method according to claim 15, wherein step e) further comprises the substeps of:

(vi) deleting the complete version of the electronic message if the recipient in step (v) is an only remaining entry in the table;

(vii) delivering the complete version of the electronic message if the recipient decides to read the complete version of the electronic message using a file transfer protocol mechanism;

(viii) making an entry in the table that the complete version of the electronic message was delivered along with a time stamp and a number of blocks downloaded; and (ix) sending a transaction to confirm delivery of the complete version of the electronic message, based on the sender's option, along with the time stamp and a number of pages the recipient has read.

17. The method according to claim 13, further comprising the step of:

e) providing a complete translation from an IP address of the recipient to the recipient's profile data.

18. An apparatus for transmitting an electronic message over the Internet, comprising:

a) a first server receiving an electronic message from the sender, which electronic message is addressed to a recipient, wherein the first mail server is a nearest mail server to the sender in the recipient's network;

b) storage being coupled to the first server and storing a complete version of the electronic message;

c) means for polling the recipient to determine if the recipient is willing to receive a brief version of the electronic message; and d) means for delivering the electronic message to the recipient's mail server if the recipient's response to the poll in step c) is no.

19. The apparatus according to claim 18, further comprising:

a) means for copying a message header from the electronic message;

b) means creating the brief version of the electronic message, which includes a hyper-link to a storage location where the complete version of the electronic message is stored, along with any applet required to read the complete version of the electronic message; and c) means for making a table entry of all recipients of the electronic message.

20. The apparatus according to claim 19, further comprising:

a) means for sending the brief version of the electronic message as a regular electronic message to the recipient's mail server, if the recipient indicates a willingness to receive the brief version;

b) means for delivering, when the recipient logs on the recipient's mail server, only the brief version of the electronic message; and c) means for sending a transaction to the first mail server from the client to delete the recipient's entry from the table, if the recipient decides to delete the brief version of the electronic message without reading the complete version.

21. The apparatus according to claim 20, further comprising:

a) means for deleting the complete version of the electronic message if the recipient is an only remaining entry in the table;

b) means for delivering the complete version of the electronic message if the recipient decides to read the complete version using a file transfer protocol mechanism;

c) means for making an entry in the table that the complete version of the electronic message was delivered along with a time stamp and a number of blocks down-loaded; and d) means for sending a transaction to confirm delivery of the complete version of the electronic message, based on the sender's option, along with the time stamp and a number of pages the recipient has read.

22. The apparatus according to claim 21, further comprising means for providing a complete translation from an IP address of the recipient to the recipients' profile data.

* * * * *